(12) United States Patent
Ding et al.

(10) Patent No.: US 12,209,404 B2
(45) Date of Patent: Jan. 28, 2025

(54) MECHANICAL LOCK FOR BUILDING COMPONENT CONNECTION

(71) Applicant: Guangzhou Metro Design & Research Institute Co., Ltd., Guangdong (CN)

(72) Inventors: Xianli Ding, Guangdong (CN); Zihui Zan, Guangdong (CN); Xingzhong Nong, Guangdong (CN); Haiou Shi, Guangdong (CN); Bao Xiang, Guangdong (CN); Juyang Wu, Guangdong (CN); Ran Wang, Guangdong (CN); Feiqi Ou, Guangdong (CN); Shengya He, Guangdong (CN); Hengyi Li, Guangdong (CN); Qian Zhou, Guangdong (CN); Chunjie Liu, Guangdong (CN); Liang Ye, Guangdong (CN)

(73) Assignee: Guangzhou Metro Design & Research Institute Co., Ltd., Guangzhou (CN)

( * ) Notice: Subject to any disclaimer, the term of this patent is extended or adjusted under 35 U.S.C. 154(b) by 512 days.

(21) Appl. No.: 17/577,413

(22) Filed: Jan. 18, 2022

(65) Prior Publication Data

US 2022/0154450 A1 May 19, 2022

Related U.S. Application Data

(63) Continuation of application No. PCT/CN2020/138745, filed on Dec. 23, 2020.

(30) Foreign Application Priority Data

Nov. 13, 2020 (CN) .......................... 202011276097.0

(51) Int. Cl.
 *E04B 1/38* (2006.01)
 *F16B 1/00* (2006.01)
 (Continued)

(52) U.S. Cl.
 CPC ............... *E04B 1/388* (2023.08); *E04B 1/38* (2013.01); *F16B 1/00* (2013.01); *F16B 2/02* (2013.01);
 (Continued)

(58) Field of Classification Search
 CPC ........ F16B 7/0453; F16B 7/0473; F16B 2/02; F16B 2/06; F16B 2/065; F16B 2/10; E04B 1/388
 See application file for complete search history.

(56) References Cited

U.S. PATENT DOCUMENTS 3,592,493 A * 7/1971 Goose ....................... E06B 3/98
 403/264
5,785,359 A * 7/1998 Nagai ..................... F16B 7/046
 403/255

(Continued)

FOREIGN PATENT DOCUMENTS

CN 208578168 U 3/2019
CN 111188418 A 5/2020
(Continued)

*Primary Examiner* — Matthew R McMahon

(57) ABSTRACT

A mechanical lock for building component connection includes a plug element (1) and a lock bod part (2). The plug element (1) includes a plug shell (10), a plug pin structure (11), and a plug transmission structure. The plug pin structure (11) is movably installed in the plug shell (10). The plug transmission structure is in transmission connection with the plug pin structure (11). An end of the plug pin structure (11) is provided with a stop part (110). The lock bod part (2) includes a lock body shell (20), a bracing structure (21), and a lock body transmission structure. An insertion channel (23) matched with the plug pin structure (11) is formed in the lock body shell (20). The lock body transmission structure is in transmission connection with the bracing structure (21).

9 Claims, 3 Drawing Sheets

(51) Int. Cl.
  *F16B 2/02* (2006.01)
  *F16B 2/06* (2006.01)
  *F16B 2/10* (2006.01)

(52) U.S. Cl.
  CPC ............... *F16B 2/06* (2013.01); *F16B 2/065* (2013.01); *F16B 2/10* (2013.01)

(56) References Cited

U.S. PATENT DOCUMENTS

| | | | | |
|---|---|---|---|---|
| 8,562,240 | B2 * | 10/2013 | Gamain | ................ F16B 7/0473 |
| | | | | 403/255 |
| 11,377,843 | B2 * | 7/2022 | Ramos | ................ E04B 1/34807 |
| 11,634,902 | B2 * | 4/2023 | Jiang | ..................... E04B 1/5831 |
| | | | | 52/698 |
| 2020/0063772 | A1 * | 2/2020 | Lin | ........................... F16B 5/02 |

FOREIGN PATENT DOCUMENTS

| | | | | |
|---|---|---|---|---|
| EP | 0528213 | A1 * | 2/1993 | |
| EP | 3106680 | A1 * | 12/2016 | |
| FR | 2562173 | A1 * | 10/1985 | |
| FR | 2599096 | A3 * | 11/1987 | |
| WO | WO-2020098387 | A1 * | 5/2020 | |

* cited by examiner

MECHANICAL LOCK FOR BUILDING COMPONENT CONNECTION

CROSS REFERENCE TO RELATED APPLICATIONS

The present application is a Continuation Application of PCT Application No. PCT/CN2020/138745 filed on Dec. 23, 2020, which claims the benefit of Chinese Patent Application No. 202011276097.0 filed on Nov. 13, 2020. All the above are hereby incorporated by reference in their entirety.

TECHNICAL FIELD

The present invention relates to the technical field of component connection, and in particular to a mechanical lock for building component connection.

BACKGROUND

Assembly construction is a new environment-friendly, efficient, and fast construction method. Usually, components are prefabricated in a factory in advance and then only need to be transported to the construction site for assembling. Therefore, assembly construction has significant technical advantages over traditional cast-in-place construction methods.

In an assembled building, connection quality between the components is a key point that affects the entire building. For example, the Chinese utility model patent with the patent number CN208578168U granted on Mar. 5, 2019 discloses a connection structure for prefabricated components, and specifically discloses that a first rigid rod and a second rigid rod are respectively pre-installed in two prefabricated components to be connected. The connection structure further includes: a screw joint, one end of which being screwed to an end of the second rigid rod, and an accommodating cavity being formed on the other end of the screw joint facing the first rigid rod; an elastic collet being in threaded connection with the screw joint and having an elastic clamping member extending into the accommodated cavity; an insertion rod having a screw section, a screw end and a reducing insertion joint being respectively arranged on both sides of the screw section; and a locking member screwed to the screw section, for fastening the elastic collet toward the insertion joint. The screw end is screwed to the first rigid rod, the insertion rod at least partially penetrates the elastic collet, and the insertion joint extends into the accommodating cavity and forms a clamping structure with the elastic clamping member.

In the connection structure for prefabricated components in the current field, the insertion rod and the first rigid rod, and the screw joint and the second rigid rod can move relative to each other to realize margin adjustment of structure connection. In actual assembly construction, seamless connection between the components is often required. However, when an existing connection structure is used, an operation space needs to be reserved, which cannot meet assembly requirements for seamless connection of the components, and the operation steps of connecting the components are cumbersome and complex, and lead to low construction efficiency.

SUMMARY

In order to solve the above problems, an objective of the present invention is to provide a mechanical lock for building component connection, to solve the problems that an operation space needs to be reserved when an existing connection structure is used, which cannot meet assembly requirements for seamless connecting of the components, besides, the operation steps of connecting the components are cumbersome and complex, and the construction efficiency is low.

A technical solution of a mechanical lock for building component connection of the present invention is as follows.

A mechanical lock for building component connection includes a plug element and a lock body part. The plug element includes a plug shell, a plug pin structure, and a plug transmission structure. The plug pin structure is movably installed in the plug shell. The plug transmission structure is in transmission connection with the plug pin structure. One end of the plug pin structure is provided with a stop part.

The lock bod part includes a lock body shell, a bracing structure, and a lock body transmission structure. An insertion channel matched with the plug pin structure is formed in the lock body shell. The lock body transmission structure is in transmission connection with the bracing structure. The bracing structure includes a tight abutting part moving in an extension direction of the insertion channel. The tight abutting part is used for being in stop fit with the stop part of the plug pin structure.

Further, the bracing structure is a herringbone bracing structure which comprises a seat body, and a first tight abutting member and a second tight abutting member hinged to the seat body. An end of the first tight abutting member away from the seat body forms the tight abutting part. An end of the second tight abutting member away from the seat body is rotatably connected to the lock body shell.

Further, the lock body transmission structure is a transmission screw threadedly installed to the lock body shell. The transmission screw is arranged with a length thereof perpendicular to the extension direction of the insertion channel. The seat body is movably connected to one end of the transmission screw located inside the lock body shell. The other end of the transmission screw is provided with a screwing part.

Further, the end of the transmission screw located inside the lock body shell is provided with a baffle. A clamping groove in stop fit with the baffle is provided on the seat body. The clamping groove is in sliding fit with the baffle in the extension direction of the insertion channel.

Further, a hinged shaft is arranged under the seat body. The first tight abutting member and the second tight abutting member is respectively connected to the hinged shaft. An outer surface of the tight abutting part is an outer arc-shaped surface. An inner side surface of the stop part is an inner arc-shaped surface. The outer arc-shaped surface is in spherical fit with the inner arc-shaped surface.

Further, the first tight abutting member and the second tight abutting member are both in a plate-shaped structure. The end of the second tight abutting member away from the seat body is provided with a cylinder. A length of the cylinder is parallel to an axial direction of a hinged shaft. An inner wall of the lock body shell is provided with a cylindrical groove in concave-convex fit with the cylinder.

Further, the plug transmission structure is a transmission shaft rotatably installed to the plug shell. An axis of the transmission shaft is perpendicular to the extension direction of the insertion channel. The transmission shaft is provided with a gear for stop or rotation. The plug pin structure is provided with a rack section engaged with the gear. An end of the transmission shaft is also provided with a screwing part.

Further, the plug pin structure is an L-shaped plate. A long slot is formed in a long side of the L-shaped plate. The gear with a clearance is installed in the long slot. The rack section is arranged on an inner wall of the long slot. A short side of the L-shaped plate may form the stop part.

Further, a lower side of the lock body shell is provided with a bottom plate extending oblique to the extension direction of the insertion channel. A supporting plane is formed on an upper edge of the bottom plate.

Further, the stop part of the plug pin structure is provided with an inclined surface. The inclined surface is in sliding fit with an upper surface of the bottom plate.

Beneficial effects: during construction, the plug element and the lock bod part of the mechanical lock are respectively prefabricated in two components, such that the plug transmission structure of the plug element and the lock body transmission structure of the lock bod part can be driven and operated externally, the plug pin structure is driven by the plug transmission structure to move, and a movement direction of the plug pin structure corresponds to the insertion channel of the lock bod part. When the plug pin structure completely enters into the insertion channel, the lock body transmission structure is operated to drive the bracing structure to move. Since the bracing structure includes the tight abutting part moving in the extension direction of the insertion channel, the stop part of the plug pin structure is stopped by the tight abutting part of the bracing structure from retreating, such that the plug pin structure is prevented from being pulled out from the insertion channel, the plug element and the lock bod part are effectively connected, therefore, the connection between two components is firm and reliable.

It should be noted that when the mechanical lock for building component connection is used for component connection, the plug transmission structure drives the plug pin structure to move, and the lock body transmission structure drives the tight abutting part of the bracing structure to move in the direction of the insertion channel so as to stop the plug pin structure from retreating. The operations of these two steps are respectively completed on the plug element (or its corresponding building component) and the lock bod part (or its corresponding building component), such that an assembly operation between the two components is avoided, and an operation space does not need to be reserved at a docking position, which meets assembly requirements for seamless connection of the building components. Moreover, the operation of connecting the building components is rapid and convenient, and the construction efficiency is higher than traditional methods.

Figure 1:
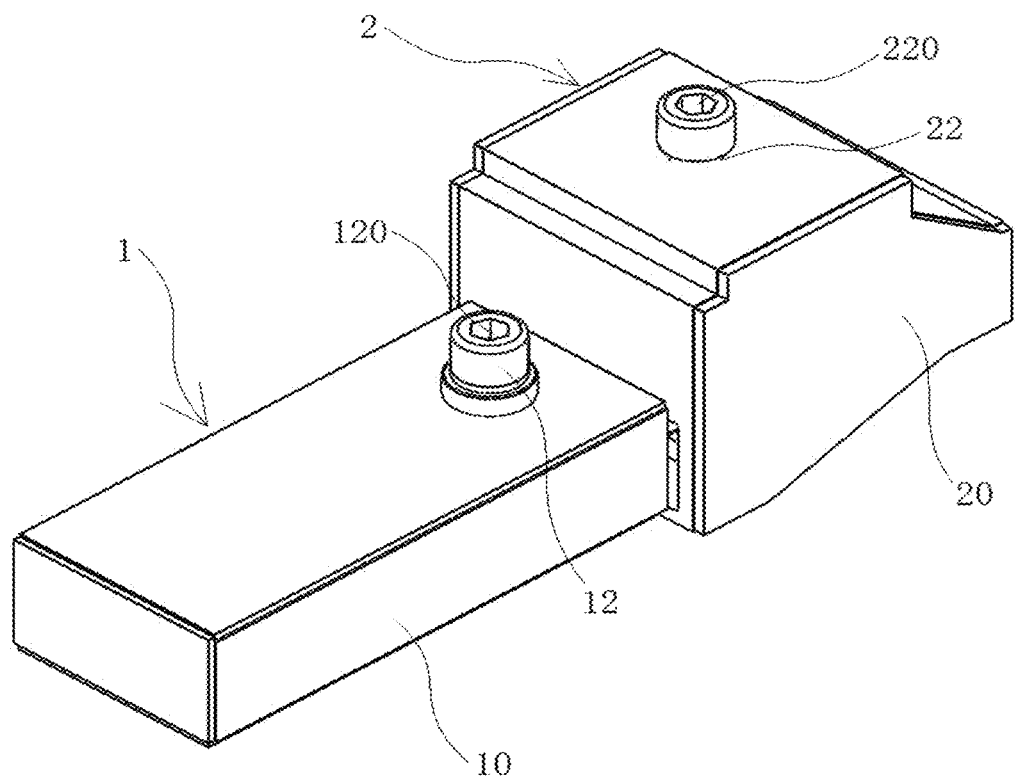
FIG. 1 is a three-dimensional schematic diagram of a mechanical lock for building component connection in a specific embodiment 1 of a mechanical lock for building component connection according to the present invention.

In the drawings: 1—plug element, 10—plug shell, 11—plug pin structure, 110—stop part, 111—rack section, 112—inner arc—shaped surface, 113—long slot, 114—inclined surface, 12—transmission shaft, 120—screwing part of transmission shaft, 121—gear, 2—lock bod part, 20—lock body shell, 200—bottom plate, 201—supporting plane, 21—bracing structure, 210—seat body, 211—first tight abutting member, 2111—tight abutting part, 212—second tight abutting member, 213—hinged shaft, 214—cylinder, 215—outer arc—shaped surface, 216—clamping groove, 22—transmission screw, 220—screwing part of transmission screw, 221—baffle, and 23—insertion channel.

DETAILED DESCRIPTION

The specific implementations of the present invention are described in more details below with reference to the accompanying drawings and embodiments. The following embodiments are illustrative of the present invention and should not be construed as limiting of the scope of the present invention.

Figure 2:
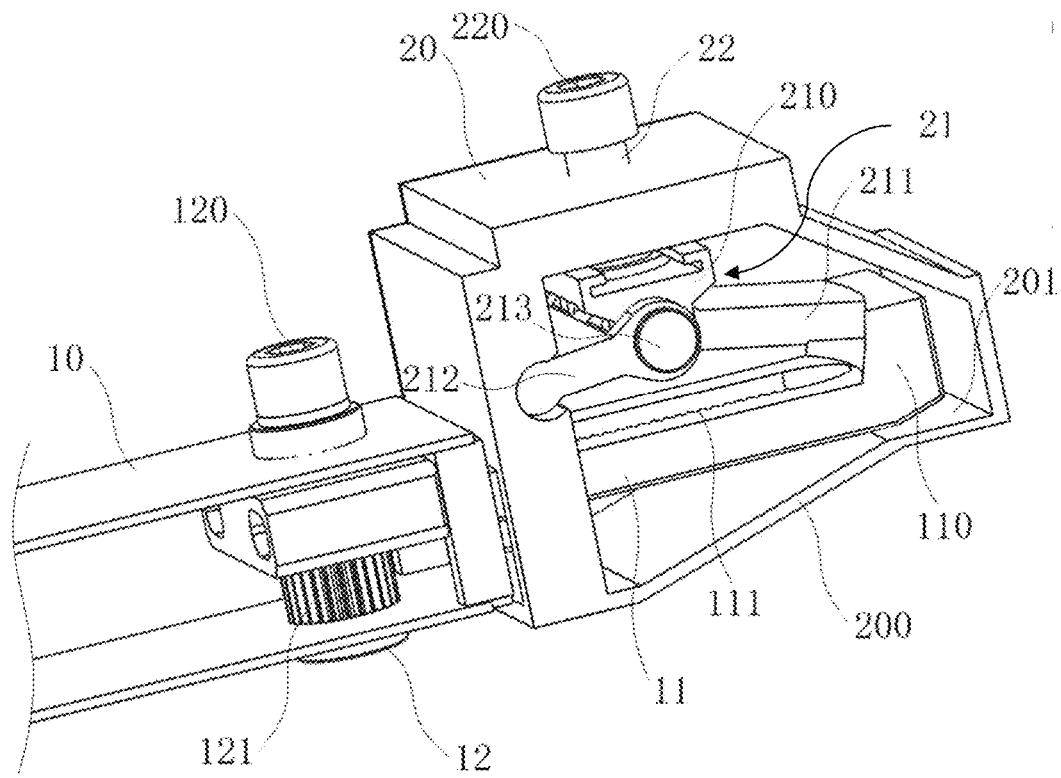
FIG. 2 is a schematic diagram of an internal structure of the mechanical lock for building component connection in the specific embodiment 1 of the mechanical lock for building component connection according to the present invention.
Figure 3:
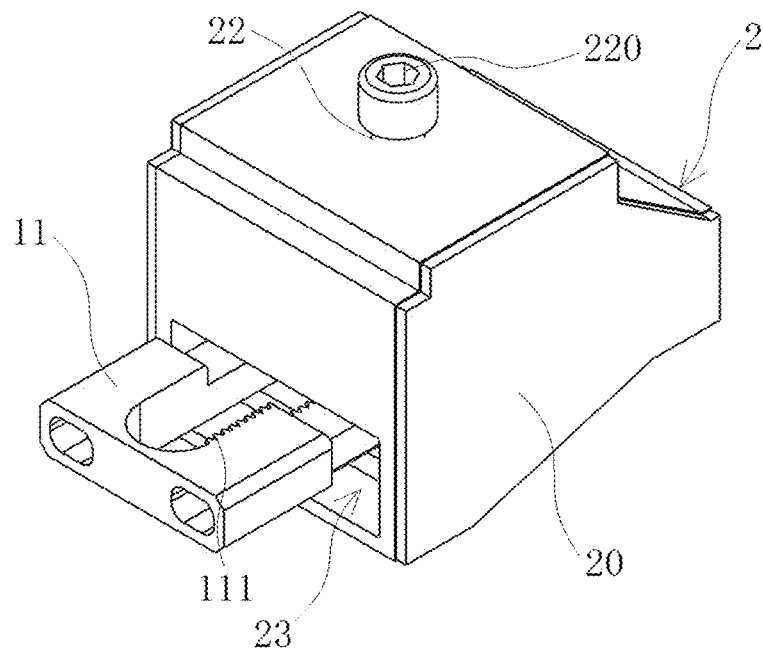
FIG. 3 is a three-dimensional schematic diagram showing a plug pin structure and a lock bod part in the specific embodiment 1 of the mechanical lock for building component connection according to the present invention, in an assembled state.
Figure 4:
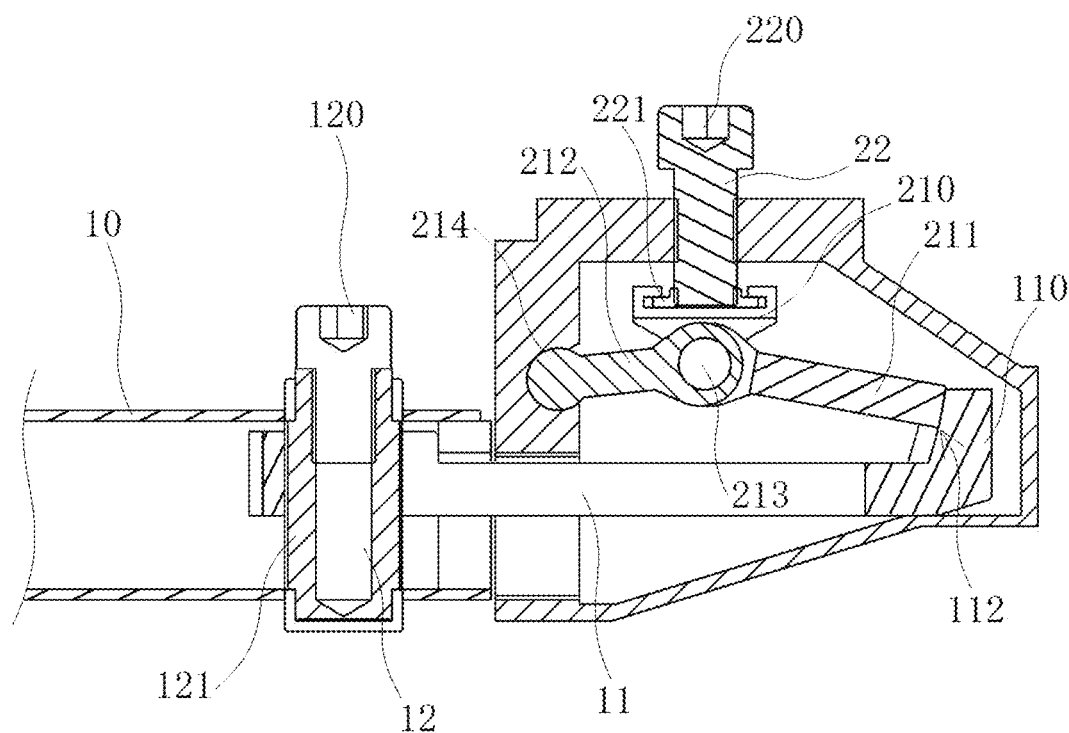
FIG. 4 is a schematic partial sectional view of the mechanical lock for building component connection in FIG. 2.
Figure 5:
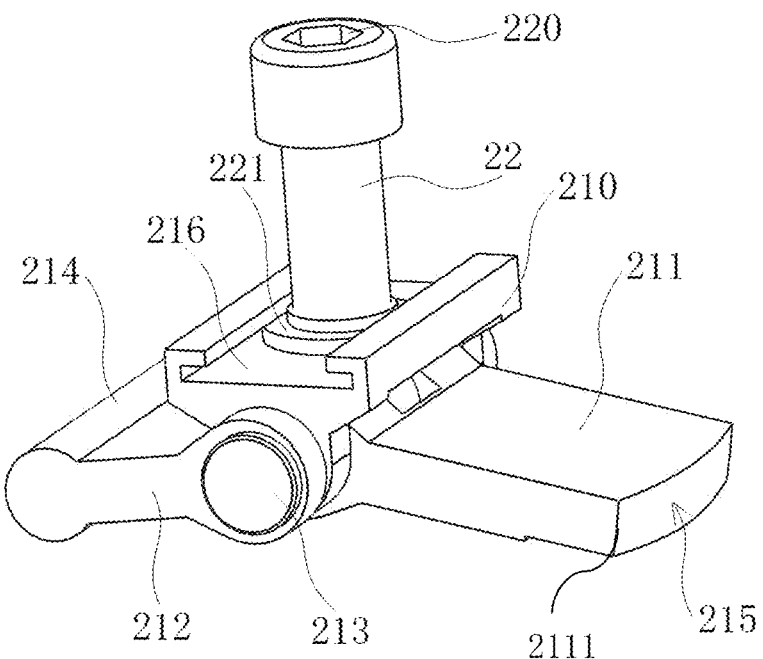
FIG. 5 is a schematic diagram showing a bracing structure and a transmission screw in FIG. 2 in an assembled state.
Figure 6:
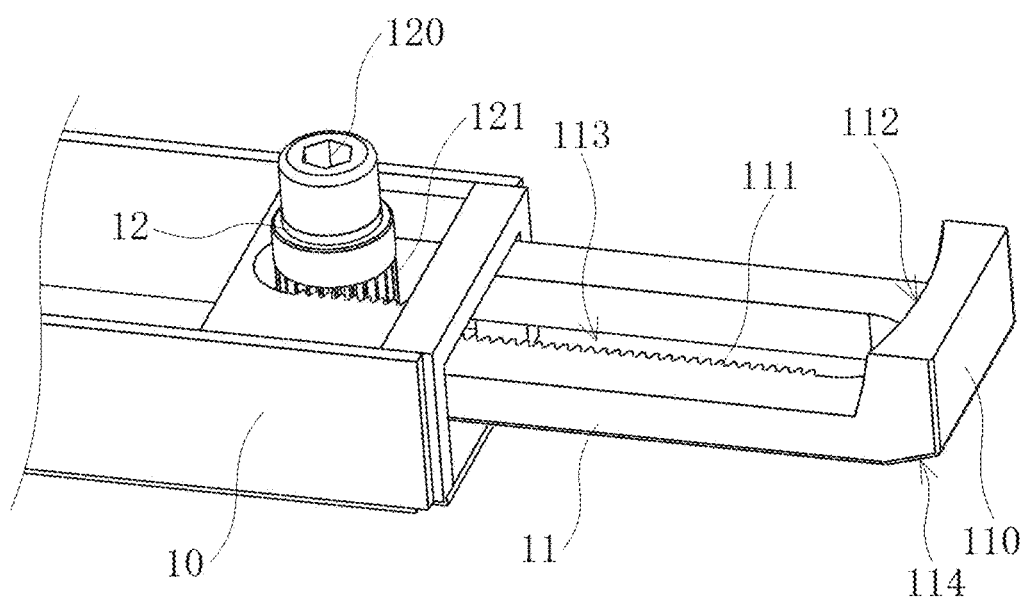
FIG. 6 is a schematic diagram of a detailed structure of a plug element in the specific embodiment 1 of the mechanical lock for building component connection according to the present invention.

In a specific embodiment 1 of a mechanical lock for building component connection according to the present invention, as shown in FIG. 1 to FIG. 6, the mechanical lock for building component connection includes a plug element 1 and a lock bod part 2. The plug element 1 includes a plug shell 10, a plug pin structure 11, and a plug transmission structure. The plug pin structure 11 is movably installed in the plug shell 10. The plug transmission structure is in transmission connection with the plug pin structure 11. An end of the plug pin structure 11 is provided with a stop part 110. The lock bod part 2 includes a lock body shell 20, a bracing structure 21, and a lock body transmission structure. An insertion channel 23 matched with the plug pin structure 11 is formed in the lock body shell 20. The lock body transmission structure is in transmission connection with the bracing structure 21. The bracing structure 21 includes a tight abutting part 2111 moving in an extension direction of the insertion channel 23. The tight abutting part 2111 is used for being in stop fit with the stop part 110 of the plug pin structure 11.

During construction, the plug element 1 and the lock bod part 2 of the mechanical lock are respectively prefabricated in two components, such that the plug transmission structure of the plug element 1 and the lock body transmission structure of the lock bod part 2 can be driven and operated externally, the plug pin structure 11 is driven by the plug transmission structure to move, and a movement direction of the plug pin structure 11 corresponds to the insertion channel 23 of the lock bod part 2. When the plug pin structure 11 completely enters into the insertion channel 23, the lock body transmission structure is operated to drive the bracing structure 21 to move. Since the bracing structure 21 includes the tight abutting part 2111 moving in the extension direction of the insertion channel 23, the stop part 110 of the plug pin structure 11 is stopped by the tight abutting part 2111 of the bracing structure 21 from retreating, such that the plug pin structure 11 is prevented from being pulled out from the insertion channel 23, the plug element 1 and the lock bod part 2 are effectively connected, and therefore, the connection between two components is firm and reliable.

It should be noted that when the mechanical lock for building component connection is used for component connection, the plug transmission structure drives the plug pin structure 11 to move, and the lock body transmission structure drives the tight abutting part 2111 of the bracing structure 21 to move in the direction of the insertion channel 23 so as to stop the plug pin structure 11 from withdrawing. The operations of these two steps are respectively completed on the plug element 1 (or its corresponding building component) and the lock bod part 2 (or its corresponding building component), such that an assembly operation between the two components is avoided, and an operation space does not need to be reserved at a docking position, which meets assembly requirements for seamless connection of the building components. Moreover, the operation of connecting the building components is rapid and convenient, and the construction efficiency is relatively higher than traditional methods.

In the present embodiment, the bracing structure 21 is a herringbone bracing structure and includes a seat body 210, and a first tight abutting member 211 and a second tight abutting member 212 hinged to the seat body 210. An end of the first tight abutting member 211 away from the seat body 210 forms the tight abutting part 2111. An end of the second tight abutting member 212 away from the seat body 210 is rotatably connected to the lock body shell 20. The seat body 210 is located at an upper part of the herringbone bracing structure. The first tight abutting member 211 and the second tight abutting member 212 are respectively rotatably connected to two lower sides of a lower part of the seat body 210. The second tight abutting member 212 is rotatably connected to the lock body shell 20, and a pull-out force exerted on the first tight abutting member 211 is reliably transmitted to the lock body shell 20, so that the bracing structure 21 has a stable stopping effect.

Specifically, the lock body transmission structure is a transmission screw 22 threadedly installed to the lock body shell 20. A length of the transmission screw 22 is arranged perpendicular to the extension direction of the insertion channel 23. The seat body 210 is movably connected to one end of the transmission screw 22 located inside the lock body shell 20. The other end of the transmission screw 22 is provided with a screwing part. The screwing part is a screwing part 220 of the transmission screw. The transmission screw 22 is arranged perpendicular to the extension direction of the insertion channel 23. The seat body 210 is driven by the transmission screw 22 to move in an extension direction of the transmission screw 22, so that the first tight abutting member 211 and the second tight abutting member 212 are lifted up or pressed down. The two tight abutting members are brought together when lifted up, or expanded when pressed down, thereby playing a tightening or stopping effect on the stop part 110.

In the present embodiment, the end of the transmission screw 22 located inside the lock body shell 20 is provided with a baffle 221. A clamping groove 216 in stop fit with the baffle 221 is provided on the seat body 210. The clamping groove 216 is in sliding fit with the baffle 221 in the extension direction of the insertion channel 23. The baffle 221 of the transmission screw 22 is rotatably installed in the clamping groove 216 of the seat body 210, and a lifting or pressing action is transferred by the baffle 221 to the seat body 210. Due to the sliding fit between the clamping groove 216 and the baffle 221, it is ensured that when the second tight abutting member 212 rotates, the seat body 210 can be also driven to slide in the extension direction of the insertion channel 23, thereby ensuring that all parts of the entire bracing structure 21 can move freely.

Specifically, a hinged shaft 213 is arranged under the seat body 210. The first tight abutting member 211 and the second tight abutting member 212 are respectively connected to the hinged shaft 213. An outer surface of the tight abutting part 2111 is an outer arc-shaped surface 215. An inner side surface of the stop part 110 is an inner arc-shaped surface 112. The outer arc-shaped surface 215 is in spherical fit with the inner arc-shaped surface 112. The outer surface of the tight abutting part 2111 is designed as the outer arc-shaped surface 215, and the inner side surface of the stop part 110 is designed as the inner arc-shaped surface 112, so that when the tight abutting part 2111 and the stop part 110 are in stop fit, since the outer arc-shaped surface 215 is in spherical fit with the inner arc-shaped surface 112, the plug pin structure 11 can rotate in the insertion channel 23. When there is an angular deviation between two components during assembly, an installation error can be adjusted by such spherical fit.

Moreover, the first tight abutting member 211 and the second tight abutting member 212 are both in a plate-like structure. The end of the second tightening member 212 away from the seat body 210 is provided with a cylinder 214. A length of the cylinder 214 is parallel to an axial direction of a hinged shaft 213. An inner wall of the lock body shell 20 is provided with a cylindrical groove in concave-convex fit with the cylinder 214. A lower side of the lock body shell 20 is provided with a bottom plate 200 extending oblique to the extension direction of the insertion channel 23. A supporting plane 201 is formed on an upper edge of the bottom plate 200. The plug pin structure 11 can be guided by the obliquely extending bottom plate 200 to move upward, and support the stop part 110 of the plug pin structure 11 through the supporting plane 201 when it reaches the supporting plane 201.

In the present embodiment, the plug transmission structure is a transmission shaft 12 rotatably installed to the plug shell 10. An axis of the transmission shaft 12 is perpendicular to the extension direction of the insertion channel 23. The transmission shaft 12 is provided with a gear 121 for stop or rotation. The plug pin structure 11 is provided with a rack section 111 engaged with the gear 121. An end of the transmission shaft 12 is also provided with a screwing part. The screwing part is a screwing part 120 of the transmission shaft. The plug pin structure 11 is driven by means of the transmission shaft 12 to extend and retract in the extension direction of the insertion channel through gear and rack cooperation. It should be noted that the screwing part 120 of the transmission shaft and the screwing part 220 of the transmission screw are counterbore nuts, that is, a hexagonal counterbore is formed on a nut. A hexagonal wrench is inserted into the hexagonal counterbore to perform a screwing operation, thereby driving the plug pin structure 11 and the bracing structure 21 to work.

The plug pin structure 11 is an L-shaped plate. A long slot 113 is formed in a long side of the L-shaped plate. The gear 121 is installed in the long slot 113 with a clearance. The rack section 111 is arranged on an inner wall of the long slot 113. An end of the long side of the L-shaped plate is provided with a slider which is in sliding fit with an inner wall of the plug shell 10 to ensure that the plug pin structure 11 will not shake in the plug shell 10. A short side of the L-shaped plate forms the stop part 110. The stop part 110 of the plug pin structure 11 is further provided with an inclined surface 114. The inclined surface 114 is in sliding fit with an upper surface of the bottom plate 200, so as to guide the plug pin structure 11 to slide in an obliquely upward direction to a retreat stopping position.

In other specific embodiments of the mechanical lock for building component connection according to the present invention, in order to meet different use requirements, the herringbone bracing structure may be replaced with other forms of structure, for example, a bracing structure made of an arched steel plate. A connecting seat is arranged on the arched steel plate, and the connecting seat is rotatably connected to the transmission screw. The arched steel plate expands and deforms when pressed down to the plug pin structure, such that an edge of the arched steel plate plays a role of stopping retreat on the stop part of the plug pin structure.

In other specific embodiments of the mechanical lock for building component connection according to the present invention, in order to meet different use requirements, the first tight abutting member and the second tight abutting member in a plate-shaped structure may be replaced with rods, frames, or T-shaped members, which can also achieve the purpose of tight supporting and stopping retreat of the plug pin structure.

The foregoing descriptions are only preferred implementations of the present invention. It should be noted that several improvements and replacements may further be made by a technicist without departing from the principle of the present invention, and such improvements and replacements should also be deemed as falling within the protection scope of the present invention.

The invention claimed is:

1. A mechanical lock for building component connection, comprising a plug element and a lock bod part, the plug element comprises a plug shell, a plug pin structure, and a plug transmission structure, the plug pin structure is movably installed in the plug shell, the plug transmission structure is in transmission connection with the plug pin structure, and one end of the plug pin structure is provided with a stop part;

the lock bod part comprises a lock body shell, a bracing structure, and a lock body transmission structure, an insertion channel matched with the plug pin structure is formed in the lock body shell, the lock body transmission structure is in transmission connection with the bracing structure, the bracing structure includes a tight abutting part moving in an extension direction of the insertion channel, and the tight abutting part is used for being in stop fit with the stop part of the plug pin structure; and the bracing structure is a herringbone bracing structure which comprises a seat body, and a first tight abutting member and a second tight abutting member hinged to the seat body, an end of the first tight abutting member away from the seat body forms the tight abutting part, and an end of the second tight abutting member away from the seat body is rotatably connected to the lock body shell.

2. The mechanical lock for building component connection according to claim 1, wherein the lock body transmission structure is a transmission screw threadedly installed to the lock body shell, the transmission screw is arranged with a length thereof perpendicular to the extension direction of the insertion channel, the seat body is movably connected to one end of the transmission screw located inside the lock body shell, and the other end of the transmission screw is provided with a screwing part.

3. The mechanical lock for building component connection according to claim 2, wherein the end of the transmission screw located inside the lock body shell is provided with a baffle, a clamping groove in stop fit with the baffle is provided on the seat body, and the clamping groove is in sliding fit with the baffle in the extension direction of the insertion channel.

4. The mechanical lock for building component connection according to claim 1, wherein a hinged shaft is arranged under the seat body, the first tight abutting member and the second tight abutting member are respectively connected to the hinged shaft, an outer surface of the tight abutting part is an outer arc-shaped surface, an inner side surface of the stop part is an inner arc-shaped surface, and the outer arc-shaped surface is in spherical fit with the inner arc-shaped surface.

5. The mechanical lock for building component connection according to claim 1, wherein the first tight abutting member and the second tight abutting member are both in a plate-shaped structure, the end of the second tight abutting member away from the seat body is provided with a cylinder, a length of the cylinder is parallel to an axial direction of a hinged shaft, and an inner wall of the lock body shell is provided with a cylindrical groove in concave-convex fit with the cylinder.

6. The mechanical lock for building component connection according to claim 1, wherein the plug transmission structure is a transmission shaft rotatably installed to the plug shell, an axis of the transmission shaft is perpendicular to the extension direction of the insertion channel, the transmission shaft is provided with a gear for stop or rotation, the plug pin structure is provided with a rack section engaged with the gear, and an end of the transmission shaft is also provided with a screwing part.

7. The mechanical lock for building component connection according to claim 6, wherein the plug pin structure is an L-shaped plate, a long slot is formed in a long side of the L-shaped plate, the gear with a clearance is installed in the long slot, the rack section is arranged on an inner wall of the long slot, and a short side of the L-shaped plate forms the stop part.

8. The mechanical lock for building component connection according to claim 1, wherein a lower side of the lock body shell is provided with a bottom plate extending oblique to the extension direction of the insertion channel, and a supporting plane is formed on an upper edge of the bottom plate.

9. The mechanical lock for building component connection according to claim 8, wherein the stop part of the plug pin structure is further provided with an inclined surface, and the inclined surface is in sliding fit with an upper surface of the bottom plate.

* * * * *